May 1, 1962 R. M. ASHBY 3,032,759
CONICAL SCANNING SYSTEM
Filed Aug. 31, 1956 3 Sheets-Sheet 1

INVENTOR.
ROBERT M. ASHBY
BY Frederic B. Schramm
ATTORNEY

INVENTOR.
ROBERT M. ASHBY

United States Patent Office 3,032,759
Patented May 1, 1962

3,032,759
CONICAL SCANNING SYSTEM
Robert M. Ashby, Pasadena, Calif., assignor to
North American Aviation, Inc.
Filed Aug. 31, 1956, Ser. No. 607,516
9 Claims. (Cl. 343—16)

This invention relates to radar systems and particularly to an electronic radar scanning system.

Highly directional radar antennas have been developed in the past which concentrate a substantial part of the radiant energy from a radar transmitter in a very small, highly directional beam. These antennas are usually used to obtain the range and bearing indications of a reflecting target with respect to the position of the transmitter-receiver. The transmitter and antenna direct pulses of radiant energy at the target. The radar set measures range by recording the time lapse between the transmission pulse and the reception of the echo. Conventional radar sets measure bearing by determining the angular position of the antenna at the time the echo is received. Because of the highly directional characteristic of the transmitting and receiving antenna only those targets which are within a very small solid angle are detected by the radar set. Since the sensitive axis of the antenna must first be aligned with the line of sight to the target before any echo can be received, various scanning systems have been developed in the past to program scan the sensitive axis of the antenna over a large angular area in order to search or track. Most of these scanning systems involve the physical rotation of the reflector element of the antenna or antenna feed system about an axis. The physical rotation with a high degree of accuracy of such a reflector element, or feed, requires special balancing and torquing devices.

It is accordingly an object of this invention to provide a scanning system without spinning antenna reflector, or feed, elements.

Another object is to accomplish conical scan transmission in an improved manner.

An additional object is to transmit with a conical scan but receive monopulse signals.

Still another object is to enable both transmission and reception to take place according to the monopulse system.

A further object is to provide apparatus capable of transmitting either conically scanned signals or monopulse signals and capable of receiving monopulse signals.

Other and further objects, features and advantages of the invention will become apparent as the description proceeds.

In carrying out the invention in accordance with a preferred form thereof, a microwave transmitter is provided capable of generating energy of a frequency transmissible through wave guides. Two waveguide channels from the transmitter are provided, one serving as a range or sum channel and the other as a direction or error channel. An antenna of the multiple emitter type, such as a four-horn antenna, for example, is provided with a monopulse bridge device having ports connected to the range channel and the error channel for coupling these channels to the horns of the antenna.

A duplexer is interposed in the range channel consisting of a pair of side slot couplers with a pair of receiver protection tubes, commonly known as transmit-receive or TR tubes, interposed between the two side slot couplers. A range receiver is connected to the signal outlet port of the duplexer. A similar duplexer with an error receiver connected to the signal outlet port is interposed in the error channel. In addition, a continuous phase shifter is interposed in the error channel between the duplexer and the transmitter.

The energy transmitted to the antenna through the range channel is superimposed upon the split lobe monopulse characteristics of the energy transmitted from the error channel. As a result, the range channel energy in certain horns reinforces the error channel energy, and cancels out that from the error channel in other horns so that a resultant radiated antenna beam is produced which is projected at an angle to the axis of the antenna. The direction of this angle depends on the aperture, phase and amplitude relationship of the error channel energy to the range channel energy. By continuous rotation of the phase shifter, the direction of the resultant beam is continuously changed so as to produce a conical scan of the resultant emitted energy.

The duplexers prevent the direct passage of energy from the transmitter to the receivers while permitting reflected energy received by the antenna to be directed to the range and error receivers in accordance with the monopulse system instead of the conical scan system.

This system accordingly provides a conical scan radiated antenna beam for detecting a tagret. The same apparatus serves also for tracking and locating the target by the highly precise monopulse system.

A better understanding of the invention will be afforded by the following detailed description considered in conjunction with the accompanying drawings, in which.

Figure 1:
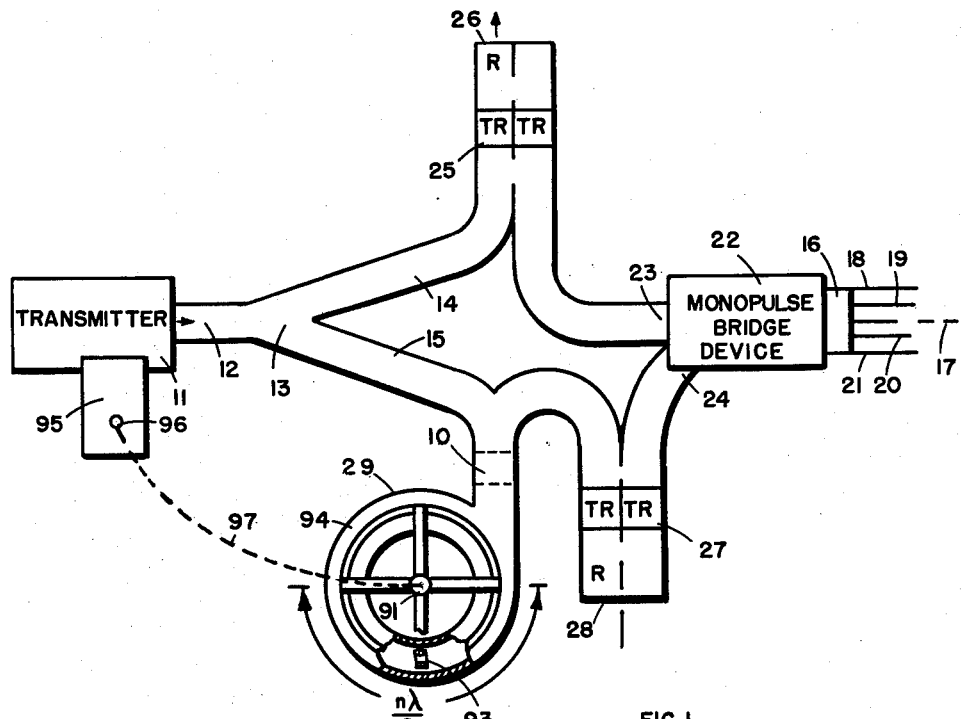
FIG. 1 is a schematic diagram of an embodiment of the invention.
Figure 4:
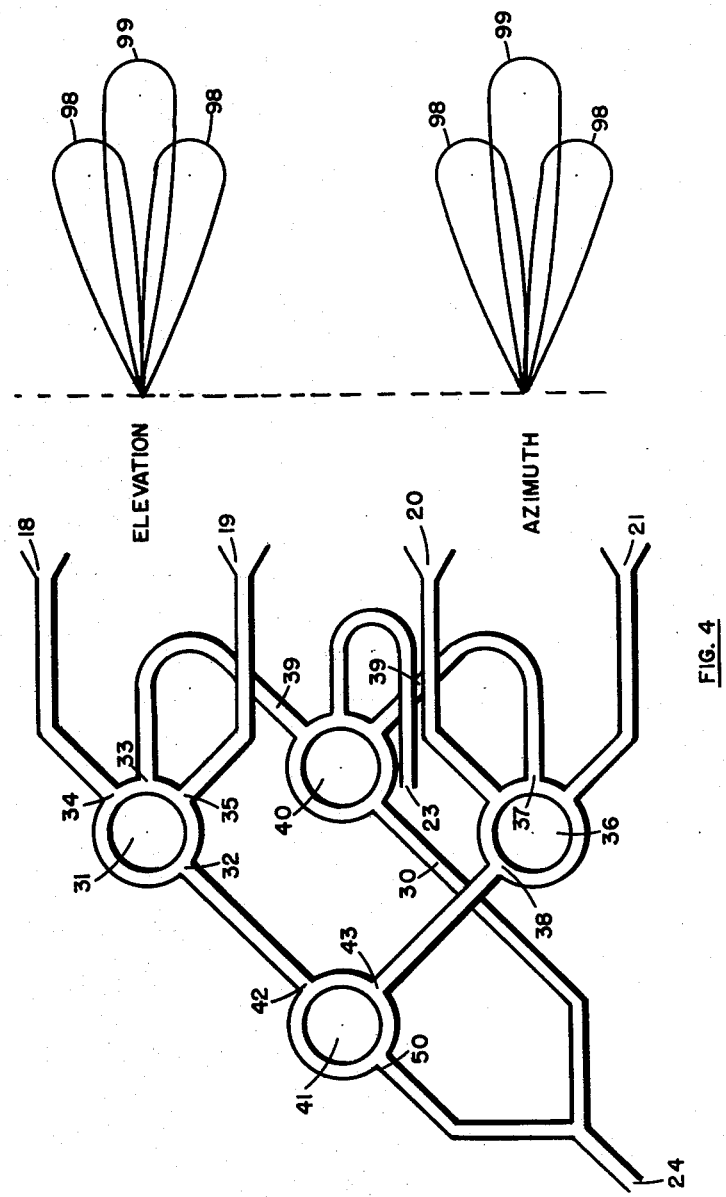
Figure 5:
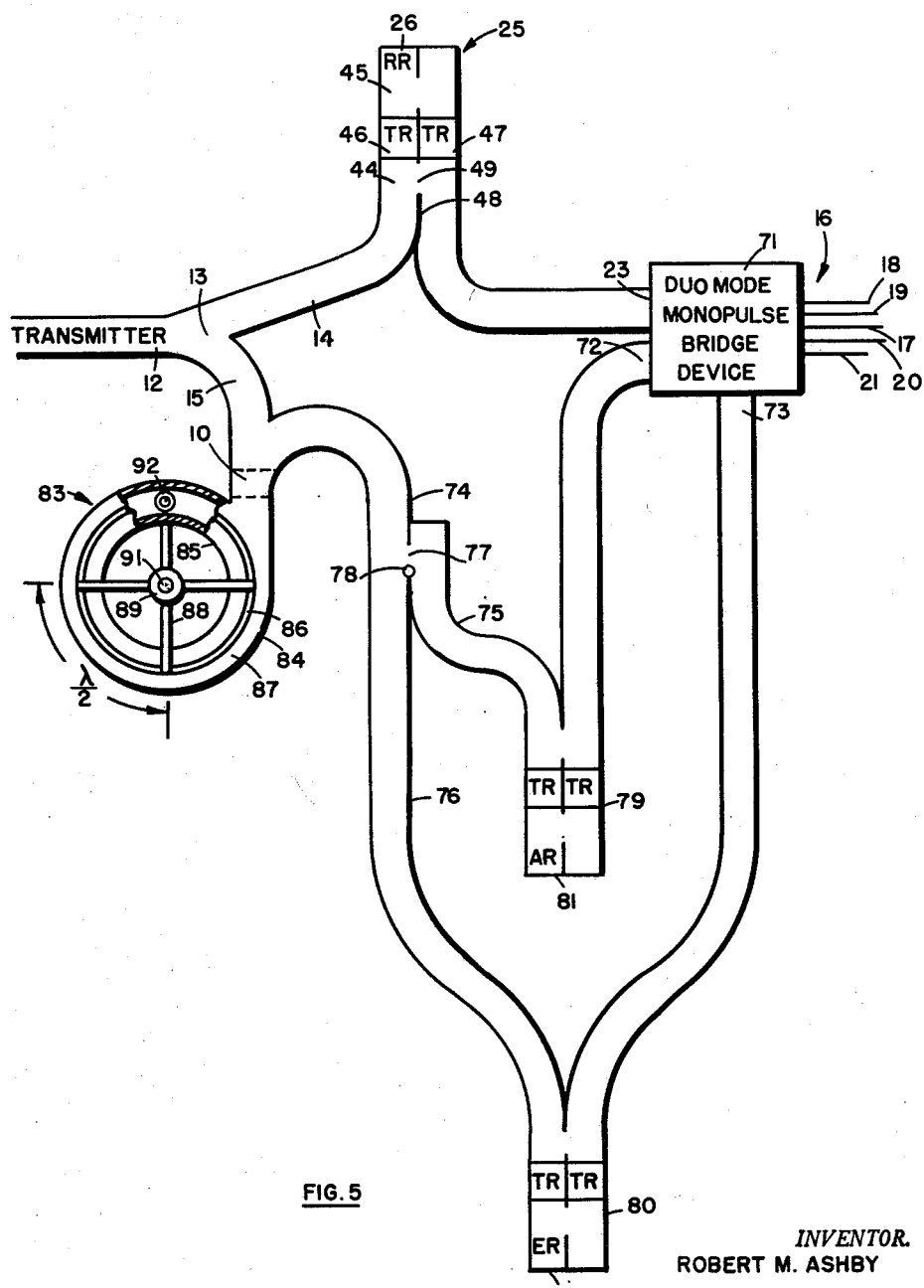

FIG. 4 is a schematic diagram of a monopulse rat race type of bridge illustrating the principle of operation involved for obtaining successively different phase relationships with respect to the error channel in the various horns of the transmitter, and showing also the shapes of the lobes of the antenna radiation pattern with respect to elevation and azimuth for both the error channel and the range channel; and FIG. 5 is a schematic diagram corresponding to FIG. 1 illustrating the manner of applying the invention in conjunction with the use of a duomode monopulse bridge device.

Like reference characters are utilized throughout the drawing to designate like parts.

Figure 3:
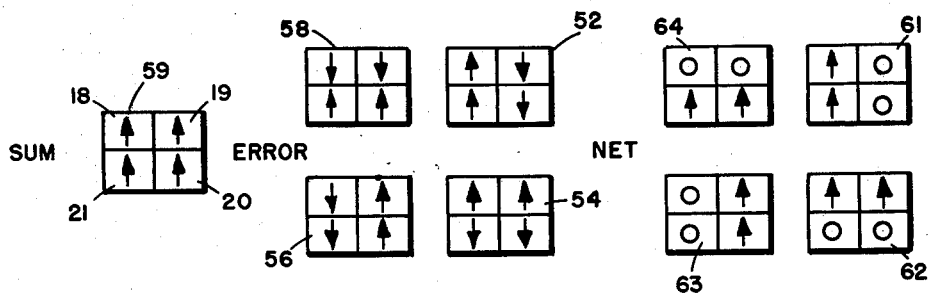
FIG. 3 is a diagram illustrating the polarity relationships of the electromagnetic fields at any given instant in the horns of the antenna as a result of the energy derived from the range or sum channel and derived from the error or difference channel.

Referring to the drawings, as shown in FIG. 1, there is a microwave radio-frequency transmitter 11 supplying a high frequency transmission line 12 in the form of waveguide, assumed for the sake of the illustration to be of the rectangular type for transmitting transverse electrical waves. It is assumed for the sake of illustration that the wide side of the waveguide 12 is in a plane parallel to the plane of the drawing and the narrow side is in the plane perpendicular to the plane of the drawing. A conventional power splitter 13 is provided for dividing the energy from waveguide 12 between two channels 14 and 15, referred to respectively as either a range, additive, or sum channel, and a direction, error, or difference channel. An antenna 16, of the multiple emitter type, is provided. The emitters of the antenna 16 are so arranged as to be symmetrical with respect to the line 17 constituting the axis of the radiation pattern of the antenna 16. Preferably, the emitters comprise a plurality of horns such as four horns 18, 19, 20 and 21 represented schematically in FIG. 1 as being side by side but actually arranged, as will be understood by those skilled in the art, at the four corners of a rectangle as illustrated in FIG. 3.

For coupling the range channel 14 and the error channel 15 to the antenna 16, a suitable monopulse coupling or bridge device 22 is employed. The monopulse bridge device 22 does not constitute a part of the present invention, but as will be explained more fully hereinafter, it is a device with a range-port 23 and an error port 24 that channelizes energy to the horns 18, 19, 20 and 21 in such a manner that energy into the range port 23 is delivered to all horns with the same relative phase while energy into the error port is delivered with successive differences in phase relationship taking place between the horns.

A duplexer 25 is interposed in the range channel 14 having an outlet port 26 for connection to a range receiver. Likewise, a duplexer 27 is interposed in the error channel 15, also having an outlet port 28, which in this case is adapted to be connected to an error receiver having provision therein for phase sensitive separation so as to produce both azimuth and elevation error signals. In addition, a continuous phase shifter 29 is interposed in the error channel 15 between the transmitter 11 and the duplexer 27 by means of a hybrid 10 similar to a side slot coupler.

In order to illustrate the manner of operation of the monopulse bridge device 22, a system for accomplishing the requisite phase relationships is illustrated in FIG. 4. A monopulse bridge device may take the form of a multiple rat race as illustrated in FIG. 4, or a magic T or other suitable means for accomplishing the same result. As illustrated, there is a rat race 31 having an error channel port 32, a range channel port 33 and emitter ports 34 and 35. The ports are so arranged that the range channel port 33 is equidistant from the emitter ports 34 and 35 in order that emitters 18 and 19 will be in the same phase relationship with respect to the range port 33. On the other hand, the distance from the emitter port 34 to the error port 32 differs by an odd number of half wavelengths from the distance between the error port 32 and the emitter port 35 so that emitters 18 and 19 are in phase opposition with respect to each other.

There is a second rat race 36 having a range port 37 and an error port 38 arranged in a similar manner with respect to emitters 20 and 21. Channels 39 from the range ports 33 and 37 are connected to the range port 23 of the bridge device 22 through a third rat race 40 at symmetrical points so that al four emitters 18, 19, 20 and 21 have the same phase relationship to the range port 23. A channel 30 from the rate race 40 is arranged to receive the difference of the inputs from the two channels 39. On the other hand, a channel 50 from the rat race 41 is arranged to receive the difference of the signals from the ports 32 and 38. The signals in channels 30 and 50 constitute elevation and azimuth error signals, respectively. For combining the error signals, the channels 30 and 50 are joined at the error port 24. The lengths of the channels 30 and 50 differ by an odd number of quarter wavelengths in order to introduce a quadrature relationship between the pairs of emitters 18 and 19, and 20 and 21.

The duplexers 25 and 27, shown in FIG. 1, each comprise a pair of side slot couplers 44 and 45 with gas filled-glass-envelope TR tubes 46 and 47 of the same physical dimensions as the waveguides interposed between the side slot couplers 44 and 45. Preferably, the TR tubes 46 and 47 are of the type having keep alive electrodes (not shown). As will be understood by those skilled in the art, side slot couplers consist of parallel lengths of waveguides with a common wall 48 having a slot or opening 49 therein of such dimensions that electromagnetic wave energy traveling into one of the waveguides is split equally at the slot, half continuing in the same waveguide and the other half being diverted through the slot into the other waveguide with a relative 90 degree retardation of phase.

Figure 2:
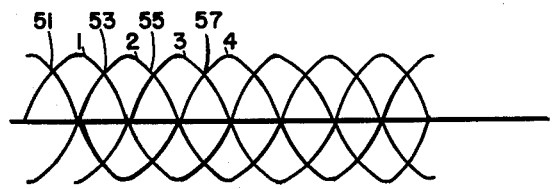
FIG. 2 is a graph illustrating the phase relationships of the energy transmitted to the various horns of the four-horn antenna by the error channel in accordance with the monopulse system.

The principle of operation of the system of FIG. 1 will become apparent from a consideration of FIGS. 2 and 3. In FIG. 2 the sine wave curves 1, 2, 3 and 4 illustrate the quadrature relationship between the field intensities of energy radiated from the emitters 18, 19, 20 and 21. It will be observed that the relationships between the field intensities in the different emitters vary from instant to instant within a cycle. For example, at the instant represented by the abscissa in 51 of FIG. 2, waves 1 and 4 are of equal amplitude and the waves 2 and 3 are also of equal amplitude but are of the opposite polarity. This situation is represented by diagram 52 in FIG. 3. At the abscissa 53 of FIG. 2 the waves 1 and 2 are positive and the waves 3 and 4 are negative. The situation is represented by diagram 54 in FIG. 3. Similarly, the situation for abscissa 55 of FIG. 3 is represented by diagram 56 of FIG. 3 and the condition for the abscissa 57 of FIG. 2 is represented by the diagram 58 of FIG. 3.

From FIG. 2 it will be seen that relative intensities and polarities of the instantaneous values of the energy in the radiation patterns of the four emitters 18, 19, 20 and 21 continuously vary but the relative phases are constant. The diagrams 52, 54, 56 and 58 merely represent conditions at four slected instants. These are the patterns applying only to the error channel 24. As represented in FIG. 4, the differences in space and time phase of emission from the inner channel through the emitters 18, 19, 20 and 21 result in cancellations of the energy along the axis 17 and reinforcement on either side so as to produce a radiation pattern having twin lobes 98 in the vertical plane and likewise in the horizontal plane.

As shown by the diagram 59 of FIG. 3, the energy from the channel 14 is aplied to the four emitters 18, 19, 20 and 21 with the same phase relationship at all times. Consequently, the range channel energy combines to form a radiation pattern with a single lobe 99. However, different lobes of the error channel radiation pattern differ in time phase. For this reason, the resultant of the radiation patterns of the antenna 16 with respect to both channels 14 and 15 depends upon the phase relation between the transmitted or received energy in the two channels 14 and 15. The resultants for four different phase relationships are illustrated qualitatively by the diagrams 61, 62, 63 and 64 of FIG. 3.

Thus, with a predetermined phase relationship the resultant of diagrams 58 and 59 is represented by diagram 64 in which the opposing energies in the emitters 18 and 19 cancel each other and reinforcement of energy takes place in the emitters 20 and 21. The lobe of the resultant radiation pattern is accordingly deflected downwardly. With a relative quadrature change of phase of the error channel with respect to the range channel, the resultant is represented by diagram 61 in which the intensities for emitters 19 and 20 acting in opposition cancel out; reinforcement takes place in emitters 18 and 21 so as to deflect the lobe of the radiation pattern to the right. Similarly, for a further relative quadrature change of phase the resultant condition is represented by diagram 62, and for a still further relative quadrature change of phase the condition is represented by diagram 63.

If the phase shifter 29 is rotated continuously at a uniform velocity the resultant radiation pattern of energy transmitted through both channels 14 and 15 is accordingly a conically scanned radiation pattern. With respect to reflected energy, however, the presence of the duplexers 25 and 27 prevents passage of the return energy back through channels 14 and 15 so that conical scan resolution of the return energy does not take place. Instead, the range channel return signals travel outward from the port 26 to the range channel receiver and the error channel return signals travel outward through the port 28 of the duplexer 27 to an error channel receiver for accomplishing tracking in accordance with the monopulse system. Phase shifter 29 has no effect on the return signal energy owing to the fact that duplexer 27 prevents any reflected energy from traveling back through the phase shifter 29 in the channel 15.

The advantages of broader band operation may be obtained by utilizing an improved form of monopulse bridge device for coupling the antenna 16 to the range and error channels 14 and 15, respectively. For example, as illustrated in FIG. 5, a duomode monopulse bridge device 71 may be employed having a range port 23 and having two separate error ports 72 and 73 for azimuth and elevation error signals, respectively. A suitable duomode monopulse bridge system is described in the co-pending application of Robert M. Ashby, Serial No. 216,145, filed March 17, 1951, now Patent No. 2,956,275, assigned to the same assignee as the present application. The error channel 15 is divided by a power splitter 74 into separate azimuth and elevation error channels 75 and 76, respectively. The power splitter 74 may be of any suitable type which divides the power in channel 15. A side slot coupler of the type described in connection with duplexers 25 and 27 may be employed, if desired.

The coupler 74 has a slot 77 adjustable in area by a fine-adjustment screw 78 in order to obtain exact division of power and exact quadrature phase shift. Separate duplexers 79 and 80 of the same type as duplexer 27 are employed in error channels 75 and 76 with separate receiver ports 81 and 82 for azimuth and elevation error receivers, respectively.

It will be understood that the invention is not limited to the use of a particular type of phase shifter. However, as illustrated in FIG. 5, a phase shifter 83 may be employed which is of the water wheel type comprising a circular section 84 curved around a narrow edge 85 of a rectangular waveguide with an annular slot 86 in the wide side 87 of the waveguide for receiving supporting arms 88 secured to a hub 89 carried on a rotatable shaft 91. Each of the arms 88 carries a resonant device 92 such as a resonant ring which serves the purpose of terminating the curved line section 84 at the location of the resonant ring 92. By continuous rotation of the resonant rings 92 around the supporting hub 89 on the shaft 91, the location of the termination is successively changed so as to change the effective length of the error channel 15 and therefore the phase relationship between the transmitter 12 and the error ports 72 and 23. The resonant rings 92 and the supporting arms 88 are spaced around the shaft 91 at such distances as to be an odd number of half wavelengths apart in the curved waveguide section 84. The conical scan system described herein has the advantages of avoidance of exposed moving parts and possibility of higher scanning speeds.

Another type of phase shifter which may be employed is the phase shifter 29 illustrated in FIG. 1 which comprises a curved circular waveguide section 94 with a choke 93 mounted therewithin upon a rotating shaft 91. Dimensions of the curved section 94 are so chosen that 180 degrees of the periphery thereof constitute an odd number of half wavelengths of the energy which is transmitted through the waveguide having the dimensions of channel 15.

Suitable means are provided for the continuous rotation of the phase shifter on the shaft 91. The rotation of the phase shifter shaft 91 may also be correlated with amplitude or frequency modulation or other characteristic of the transmitted or received wave. For example, for simultaneously guiding and tracking a self-propelled object in free space, the transmitter 11 may be provided with a modulator schematically represented by a rectangle 95 which produces a sinusoidal modulation in accordance with rotation of a control shaft 96 mechanically or electrically interconnected with the shaft 91 of the phase shifter 29 or 83 by means represented schematically by a flexible cable 97.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A radiant energy system comprising in combination a transmitter with first and second channels therefrom, a duplexer interposed in the first channel with a range receiver output, a four-horn antenna, a monopulse bridge device with means of connecting it to the antenna and with range and error ports, a continuous phase shifter and a second duplexer interposed in the second channel with an error receiver output, the first and second channels being connected to the range and error ports, respectively, of the monopulse bridge device.

2. A system as in claim 1 in which the phase shifter is rotatable and the system includes a modulated pulsed transmitter having a modulator sinusoidally responsive to rotation of the phase shifter for correlating pulsing and conical scanning of energy emitted from the antenna.

3. A beam scanner comprising in combination first and second transmission channels for connection to a transmitter, an antenna with a plurality of emitters spaced around an axis, a monopulse bridge device with means of connecting it to the antenna emitters and with range and error ports connected to the first and second transmission channels, respectively, and a continuous phase shifter interposed in the second channel whereby a conical scan of emitted energy is accomplished.

4. A beam scanner comprising in combination first and second transmission channels for connection to a transmitter, an antenna with a plurality of emitters spaced substantially symmetrically with respect to an axis, a coupling device with means for connecting with successively different phase relationship to the antenna emitters, said device having range and error ports connected to the first and second transmission channels, respectively, and a continuous phase shifter interposed in the second channel whereby a conical scan of emitted energy is accomplished.

5. Electromagnetic beam apparatus comprising in combination first and second transmission channels, an antenna, a monopulse bridge device coupling said antenna and said channels and means for continuously phase shifting transmission in one of the channels.

6. Electromagnetic beam apparatus comprising in combination first and second transmission channels, a variable phase shifter in one of said channels, an antenna with a plurality of emitters, a rat race with connections to the first and second transmission channels, and connections to the emitters with the same phase relationship between all emitters and the connection to the first transmission channel and with progressively different phase relations between the conncetion to the second transmission channel and the several emitters.

7. Electromagnetic beam apparatus comprising in combination first and second transmission channels, an antenna comprising a plurality of emitters, a rat race having range and error ports connected to the first and second transmission channels, respectively, said rat race being coupled with said emitters to provide output signals to the emitters, and a variable phase shifter in said second channel.

8. In electromagnetic beam apparatus a rat race having range and error ports for receiving signals, and having output ports, and emitters connected to the output ports to receive output signals, and a continuous phase shifter coupled with said error port.

9. Electromagnetic beam apparatus comprising first and second transmission channels, an antenna having a plurality of emitters, means for coupling said first channel to said emitters with the same phase relationship and for coupling said second channel to said emitters with relatively differing phase relationship, and a variable phase shifter in said second channel.

References Cited in the file of this patent

UNITED STATES PATENTS

| | | |
|---|---|---|
| 1,950,708 | Arco | Mar. 13, 1934 |
| 2,397,645 | Brown | Apr. 2, 1946 |
| 2,630,492 | Muchmore | Mar. 3, 1953 |
| 2,735,092 | Brown | Feb. 14, 1956 |
| 2,779,003 | Allen et al. | Jan. 22, 1957 |
| 2,803,817 | Marasco et al. | Aug. 19, 1957 |
| 2,821,712 | Tomiyasu | Jan. 28, 1958 |
| 2,825,057 | Worthington | Feb. 25, 1958 |
| 2,830,288 | Dicke | Apr. 8, 1958 |
| 2,851,681 | Cohn | Sept. 9, 1958 |